United States Patent
Honorato Ruíz

(10) Patent No.: US 8,573,539 B2
(45) Date of Patent: Nov. 5, 2013

(54) STRUCTURE FOR JOINING TORSION BOXES IN AN AIRCRAFT USING A TRIFORM FITTING MADE FROM NON-METALLIC COMPOSITE MATERIALS

(71) Applicant: Airbus Operations, S L., Getafe (ES)

(72) Inventor: Francisco Javier Honorato Ruíz, Madrid (ES)

(73) Assignee: Airbus Operations, S.L., Madrid (ES)

( * ) Notice: Subject to any disclaimer, the term of this patent is extended or adjusted under 35 U.S.C. 154(b) by 0 days.

(21) Appl. No.: 13/626,491

(22) Filed: Sep. 25, 2012

(65) Prior Publication Data

US 2013/0020440 A1 Jan. 24, 2013

Related U.S. Application Data

(63) Continuation of application No. PCT/ES2011/070202, filed on Mar. 25, 2011.

(30) Foreign Application Priority Data

Mar. 25, 2010 (ES) .................................. 201030444

(51) Int. Cl.
*B64C 1/26* (2006.01)
(52) U.S. Cl.
USPC ........................... 244/123.1; 244/87; 244/131
(58) Field of Classification Search
USPC ................. 244/87, 12.1, 123.2, 123.3, 123.4, 244/123.7, 123.8, 124, 131, 132
See application file for complete search history.

(56) References Cited

U.S. PATENT DOCUMENTS

| 3,499,622 | A * | 3/1970 | Surcin et al. .................. 244/130 |
| 6,311,449 | B1 | 11/2001 | Morse et al. |
| 7,509,740 | B2 * | 3/2009 | Munk et al. .................. 29/897.2 |

(Continued)

FOREIGN PATENT DOCUMENTS

| ES | 2372849 B1 * | 12/2012 |
| FR | 2916417 A1 | 11/2008 |
| WO | WO 2011117454 A1 * | 9/2011 |

OTHER PUBLICATIONS

International Search Report mailed Aug. 4, 2011 in PCT/ES2011/070202 filed Mar. 25, 2010 (with English translation).

(Continued)

*Primary Examiner* — Tien Dinh
*Assistant Examiner* — Michael Kreiner
(74) *Attorney, Agent, or Firm* — Oblon, Spivak, McClelland, Maier & Neustadt, L.L.P.

(57) ABSTRACT

The invention comprises a triform fitting 1, essentially made from non-metallic composite materials including several strengthening cross ribs 4 for joining symmetrical flanges 3 and a longitudinal flange 2. The symmetrical flanges 3 include cross slots 8 for receiving the run-out 16 of the webs 11 of several T-shaped internal stringers 9 that form part of the torsion boxes 6. The feet 10 of the stringers 9 are joined along one of their faces to the skins 7 of the torsion boxes 6, while the end zones of the free faces of said feet 10 are placed against the outer face of the symmetrical flanges 3 of the triform fitting 1. This ensures that the symmetrical flanges 3 of the triform fitting 1 remain inside the torsion boxes 6. Alternatively, the fitting 1 may not include the cross slots 8.

9 Claims, 8 Drawing Sheets

(56) References Cited

U.S. PATENT DOCUMENTS

| | | | |
|---|---|---|---|
| 8,276,848 B2* | 10/2012 | Zuniga Sagredo | 244/123.8 |
| 8,348,196 B2* | 1/2013 | Campana | 244/123.1 |
| 2005/0116105 A1* | 6/2005 | Munk et al. | 244/123 |
| 2006/0018710 A1 | 1/2006 | Durand et al. | |
| 2007/0051851 A1* | 3/2007 | Ruffin et al. | 244/131 |
| 2008/0245468 A1 | 10/2008 | Kato | |
| 2009/0065644 A1* | 3/2009 | Jacques | 244/123.1 |
| 2009/0159742 A1 | 6/2009 | Ramirez Blanco et al. | |
| 2010/0127127 A1* | 5/2010 | Manzano | 244/131 |
| 2011/0167614 A1* | 7/2011 | Martinez Fernandez et al. | 29/527.1 |

OTHER PUBLICATIONS

International Written Opinion mailed Aug. 4, 2011 in PCT/ES2011/070202 filed Mar. 25, 2010.

Niu, Michael C. Y., "Airframe Structural Design", Feb. 2002, Hong-Kong Conmilit Press, ltd. Hong-Kong, second eidtion, pp. 282-285, figures 8.6.3 (a)-(c), 8.6.6.

\* cited by examiner

STRUCTURE FOR JOINING TORSION BOXES IN AN AIRCRAFT USING A TRIFORM FITTING MADE FROM NON-METALLIC COMPOSITE MATERIALS

OBJECT OF THE INVENTION

As expressed in the title of this specification, the present invention refers to a structure for joining torsion boxes in an aircraft using a triform fitting made from non-metallic composite materials. It is applicable for joining lateral torsion boxes of a horizontal stabilizer that are joined to each other along the symmetry plane of an aircraft. It may also be applicable for joining torsion boxes that are joined together along their interface with the fuselage of the corresponding aircraft.

The joining structure of the invention includes a characteristic triform fitting made from composite materials having an organic matrix and continuous fibers mainly based on epoxy resins and carbon fibers in a large variety of structural elements.

These composite materials are used in some sectors, and more particularly in the aeronautical industry, wherein the present invention is included.

BACKGROUND OF THE INVENTION

The horizontal stabilizer of an aircraft is mainly comprised of two torsion boxes, joined to each other along the symmetry plane of an aircraft (configuration with two lateral torsion boxes) or along their interface with the fuselage (configuration with a center torsion box, aside from the lateral torsion boxes). Said torsion boxes are in turn constituted of different elements such as skins reinforced by longitudinal stringers, spars and ribs.

Nowadays and particularly in the aeronautical industry, composite materials having an organic matrix and continuous fibres, particularly an epoxy matrix and carbon fibre are massively used in a large variety of structural elements. For example, all the elements comprised in the above-mentioned torsion boxes (ribs, spars, skins, etc.) are currently manufactured using said composite materials, which will de referred to hereinafter as "CFRP" (Carbon fiber reinforced plastic) which are their English initials.

Composite materials are divided into those that, as a raw material before being processed, contain the resin pre-impregnating the carbon fibers; and those wherein the carbon fiber is not impregnated with resin (commonly known as dry fibers) and said resin is injected during the manufacturing process itself. Among these dry fabric materials is a non crimp fabric which, as it possesses good mechanic properties, can reproduce complex geometries.

In the joint between the torsion boxes it is necessary to ensure the load transmission between the elements involved, by means of a series of reinforcing/joining elements that ensure the structural integrity of the area, given that the horizontal stabilizer must act as a large structural unity. This joint has to withstand both the aerodynamic loads as well as loads derived from the mechanism used for moving or trimming the horizontal stabilizer.

In the specific case of the skins, these elements involved are two fittings with a triform section that not only join the top and bottom skins to each other, but are also joined to each other through a flat center rib. By means of these fittings that are assembled on the outside of the torsion boxes, a structural single shear joint between the skins is defined, balancing the loads in the horizontal direction and absorbing the vertical resultant load by means of the cited center rib.

These fittings have a very significant structural importance, their weight and cost being very high. In order to reduce the weight of the fittings as much as possible, as well as improving their performance against stress or corrosion, these fittings are generally made from titanium. The manufacturing process of these fittings implies a forging process and afterwards a numeric control machining process in order to provide them with the greatest strength in the main load direction and to ensure the tight tolerances required for the assembly thereof. Due to all of these factors the cost of these parts is very high.

Furthermore, it should be emphasized that the drilling of holes in this mechanic joint where, later on, the rivets that transmit the loads from some elements to others will be installed, are very complex due to the fact that it is a hybrid junction between metallic elements (fittings) and elements made from non-metallic composite materials (CFRP). These non-metallic elements are the skins (cover) including the feet of the stringers (longitudinal stiffeners elements). This complexity, mainly due to the presence of metal elements, implies that said drilling operations are long and costly.

DESCRIPTION OF THE INVENTION

The structure for joining torsion boxes in an aircraft comprises, in principle, a characteristic fitting made from non-metallic composite materials as those described in the background of the invention (organic matrix having continuous fibers, mainly based on epoxy resins and carbon fibers in a large variety of structural elements).

The torsion boxes of the aircraft are joined by means of the cited triform fitting.

Hence, the triform joining fitting comprises a longitudinal flange joined to a center rib of the aircraft and two symmetrical flanges joined to the skins of the torsion boxes.

It is characterized by the fact that the triform fitting made from composite material includes some cross ribs which substantially strengthen the fitting and, more specifically, the area of convergence of the three flanges, hereinafter called central node.

Another characteristic of the invention is that the central rib has some straight slots wherein the different cross ribs of the triform fitting are housed in order to correctly assemble said central rib in its correct position relative to the longitudinal flange of said triform fitting.

Another characteristic of the invention is that for the purpose of avoiding the need to cut the skins of the torsion boxes, the triform joining fitting is located inside the respective torsion box instead of being located outside as in the current solution. This is feasible because the fitting object of the present invention is made from composite materials and it is not necessary to inspect it so often as in the case of a conventional metal fitting which has to be placed outside the corresponding torsion box in order to allow an easy inspection.

There are two basic reasons why it is not necessary to inspect the composite fitting as frequently as the metal one (titanium): the excellent fatigue performance of the composite and the lack of risk of corrosion (non-metal, homogeneity of the materials, etc.)

Another characteristic of the invention is that the symmetric flanges of the triform joining fitting include some cross slots wherein the run-out of the webs of some internal stringers of the torsion boxes, which are T shaped fit. In turn, the joining of the symmetric flanges of the triform joining fitting to the feet of the stringers is simple, avoiding joggles in the geometry of said symmetrical flanges, on whose outer face the feet of said internal stringers are placed.

Another option that can be used to avoid these slots in the symmetric flanges of the fitting is to cut the web of the stringers before reaching the joint area. This option weakens the skins of the torsion boxes, which will require a reinforcement, but it does not weaken the fitting itself, making the fitting work in a more efficient manner and making the assembly thereof simpler since it is not necessary to fit all the webs of the stringers in the cross slots of the symmetric flanges of the triform fitting.

The joining structure of the invention is assembled and secured by means of rivets, through which the longitudinal flange of the triform fitting is joined with the central rib of the aircraft, and the symmetric flanges of the triform fitting are joined with the skins and the feet of the stringers that comprises the torsion boxes, the joint being a single shear joint or a double shear joint.

Due to the resultant force of the single shear joint in the vertical direction, there is an out of plane load of said joint which, together with other aerodynamic loads, is balanced by the central rib of the aircraft.

It has to be noticed that a triform fitting made from the mentioned composite materials, identical in its configuration to the one which is currently used is not feasible due to the fact that the resultant of the vertical load would make the carbon fiber work in a non efficient manner, producing delaminations in the central node area.

Thanks to the structural solution of the triform fitting that defines different preforms which make up each one of the sections of this triform fitting, as well as the resin transfer molding (RTM) manufacturing process wherein these preforms are joined inside the mould, the central node area of the triform section of the fitting is reinforced, so that most of the resultan vertical force is not supported as described before, this avoiding the appearance of delaminations and ensuring the structural integrity of this triform joining fitting. Those preforms which make up each one of the sections of the triform fitting comprise, for example, a non crimp fabric composite material.

The benefits of this new invention are related to a large degree with manufacturing cost savings of the triform fitting, both because of the change of material from titanium to the composite material (CFRP) as well as because of the resin transfer molding (RTM) process above mentioned, which is characterized by its low cost, good tolerances and great repeatability. To a lesser degree there are other benefits related to assembly operations, with less complex and extensive drilling operations; with the reduction in required maintenance inspections, reducing the service costs of the aircraft; and with a weight saving due to the change from the metal to the composite material (with lower density) and due to the non existence of thermal loads in the joint.

The preforms which define the triform fitting comprise couples of preformed side laminates and also a preformed upper laminate, joined to each other by the well known resin transfer molding (RTM) process, this resin material being the cohesive between said laminates to conform the assembly of the fitting as a whole composite material piece.

For the purpose of providing a better understanding of this specification and forming an integral part thereof, some figures wherein the object of the invention has been presented in an illustrative and non-restrictive manner, are attached hereto.

DESCRIPTION OF A PREFERRED EMBODIMENT OF THE INVENTION

Figure 1:
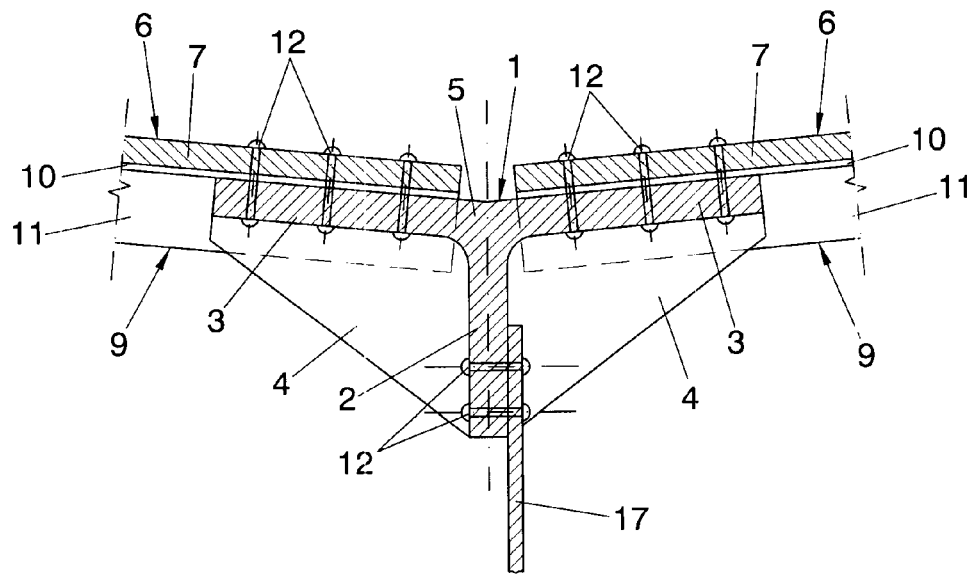
FIG. 1.—Shows a schematic section view of the structure for joining torsion boxes in an aircraft by means of a triform fitting made from non-metallic composite materials, object of the present invention. The preform configuration that makes up the triform fitting is also an object of the present invention. It incorporates a characteristic triform joining fitting manufactured with non-metallic composite materials (CFRP) that constitutes the link between the torsion boxes. The single shear joint of the torsion boxes is shown in this figure. The fitting is joined to a center rib, which is part of the aircraft structure.

Considering the numbering adopted in the figures, the structure for joining torsion boxes in an aircraft is defined by a triform joining fitting 1 manufactured with non-metallic composite materials (CFRP) which comprises a longitudinal flange 2, two symmetrical flanges 3, the symmetrical flanges 3 and the longitudinal flange 2 being joined by means of cross ribs 4 which reinforce the structure of the assembly fitting 1, and more specifically its center node 5 wherein the symmetrical flanges 3 and the longitudinal flange 2 converge. Said center node 5 is the area wherein the biggest loads are generated due to the stresses that the assembly of the joining structure of the invention must withstand.

Figure 5:
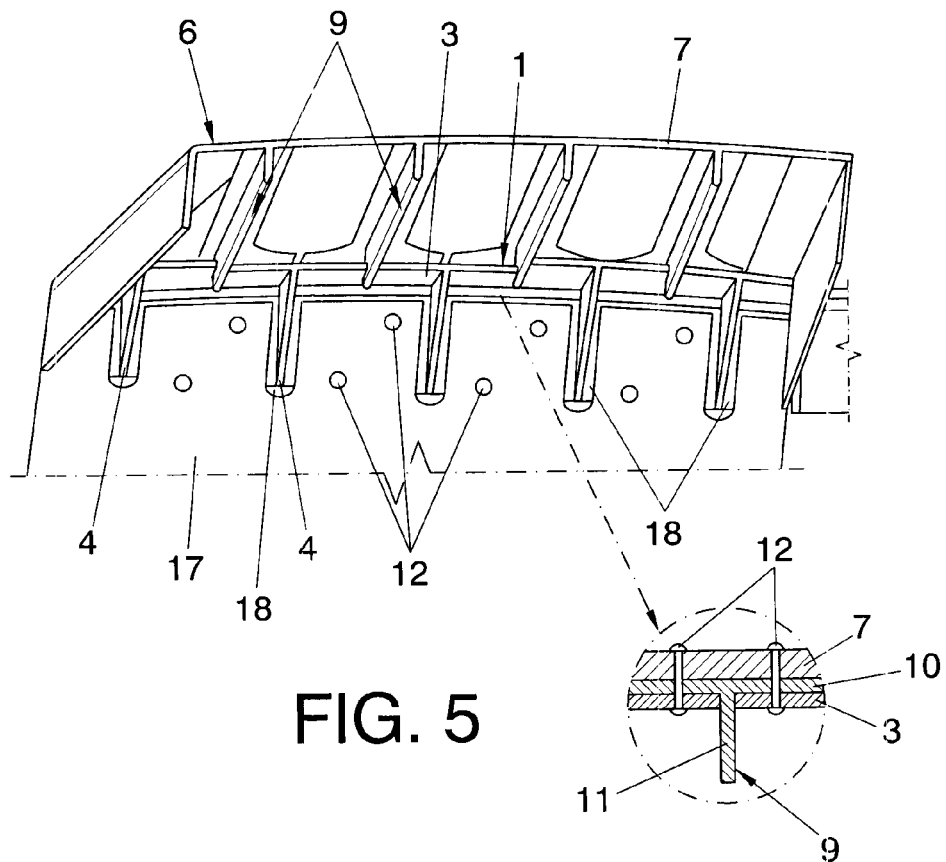
FIGS. 5 and 6.—Represent perspective views wherein the structural concept of the joint between the torsion boxes is shown, including the architecture and the configuration of all the elements involved.
Figure 6:
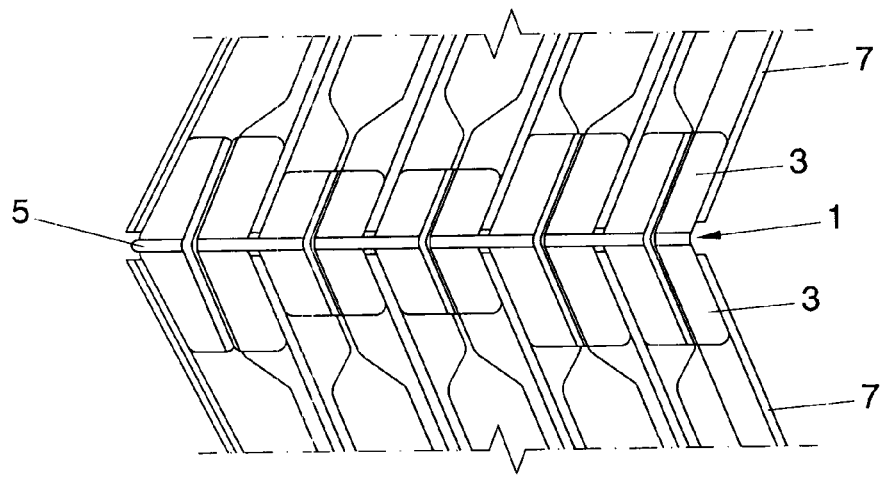

As is more clearly shown in FIGS. 5 and 6, the torsion boxes 6 are joined to the symmetrical flanges 3 of the triform fitting 1 along their skin 7 in combination with the feet 10 of some T-shaped internal stringers 10 of the torsion boxes 6, placing, in principle, these feet 10 on the external face of said symmetrical flanges 3.

To enable the above mentioned assembly, the symmetrical flanges 3 of the triform fitting have several cross slots 8 wherein the run-outs 16 of the webs 11 of the internal stringers 9 of the torsional boxes 6 fit, the internal stringers 9 whose feet 10 are integrated to the skins 7 of the torsion boxes 6 along their free faces.

Figure 12:
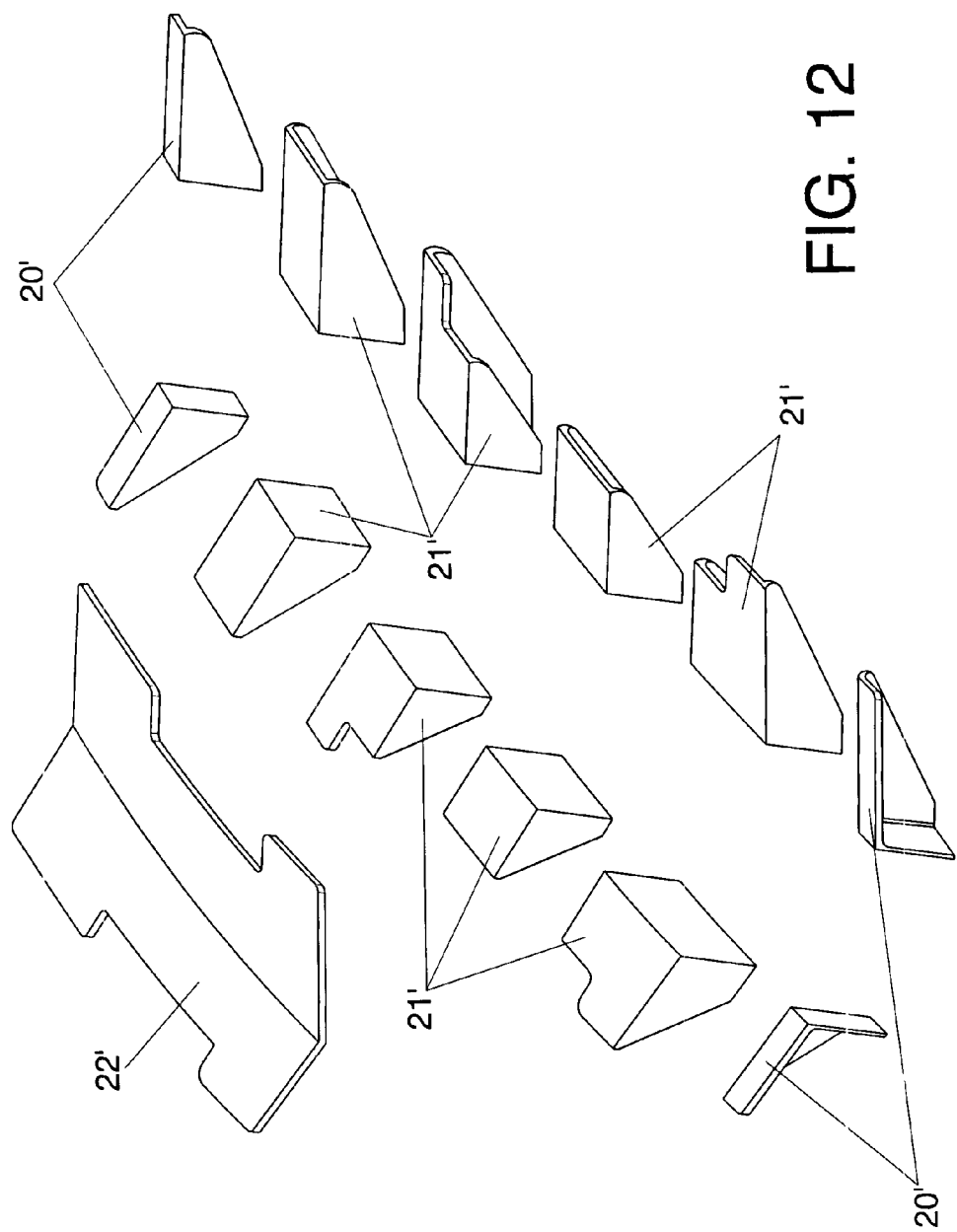
Figure 13:
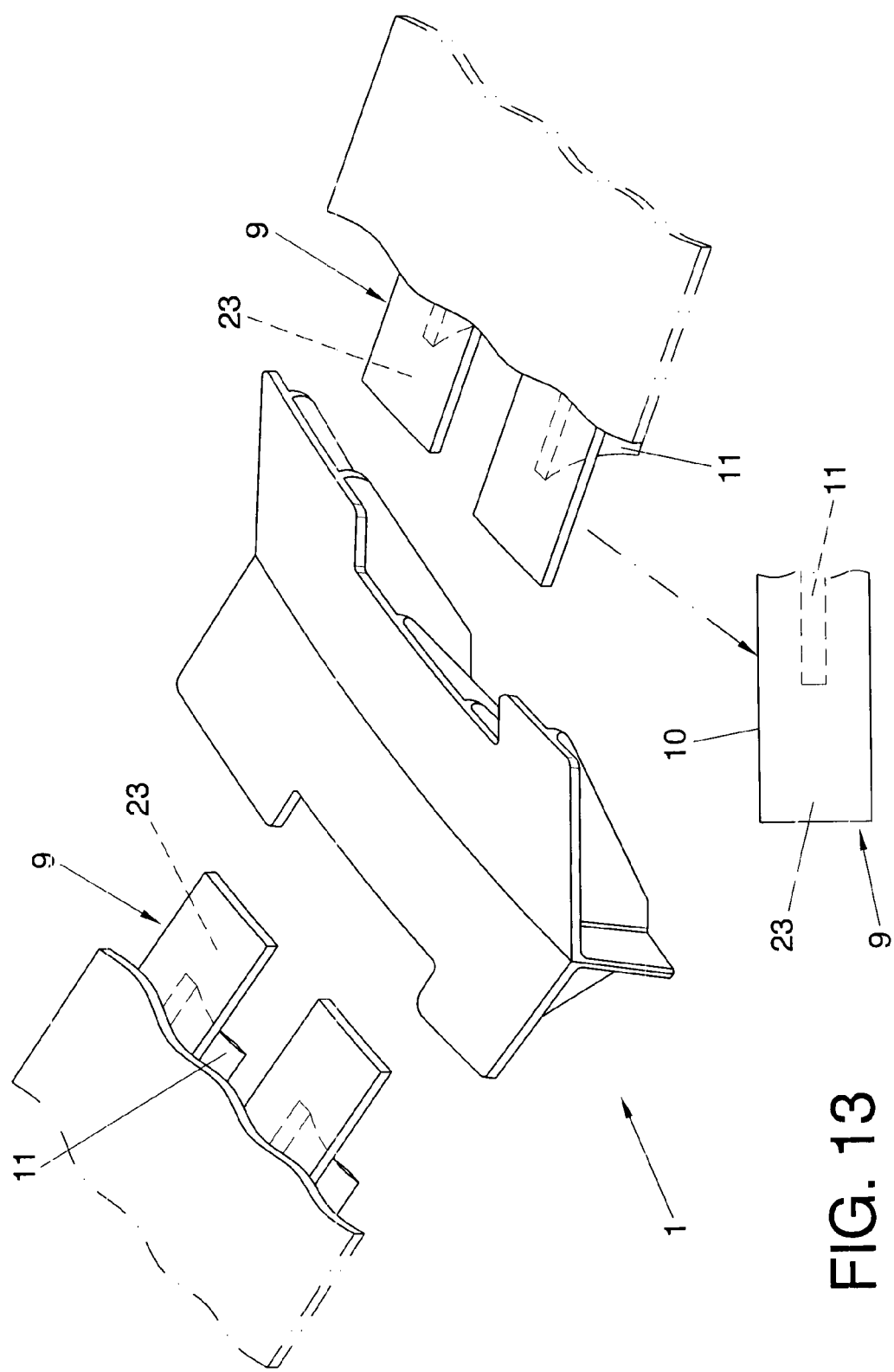
FIG. 13.—Is a perspective view of the structural joining of the torsion boxes concept in the triform fitting emphasizing a new configuration of the symmetrical flanges of the fitting adapted to a new configuration of the internal stringers of the torsion boxes.

Another option in order to avoid these cross slots 8 in the symmetric flanges 3, or at least some of them (FIGS. 12 and 13), is that the webs 11 of the internal stringers 9 do not reach the end of said internal stringers 9, therefore an end or terminal part 23 of the feet of the internal stringers 9 is without a web 11, said end part 23 being placed on the symmetric flanges 3 of the triform fitting 1 in order to be joined to it.

This option weakens the skins 7 of the torsion boxes requiring them to be reinforced, but the fitting 1 itself is not weakened, making it work more efficiently and making its assembly simpler as it is not necessary to fit all the webs 11 of the stringers 9 in the cross slots 8 of the symmetric flanges 3 of the triform fitting 1.

Figure 7:
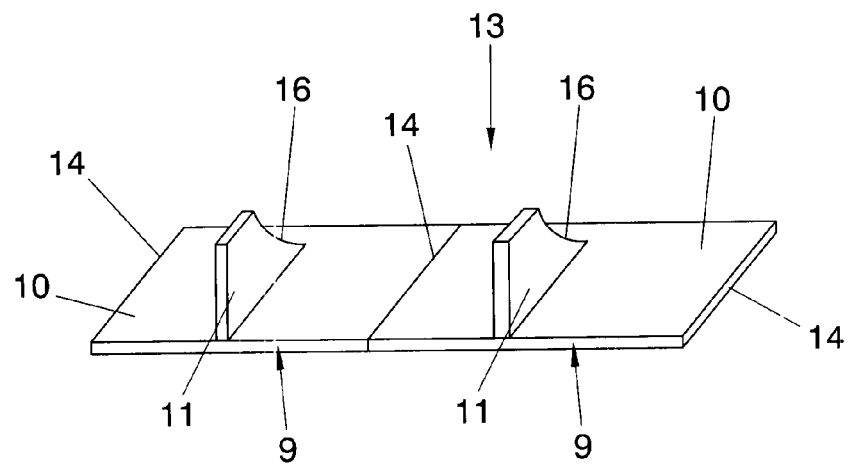
FIG. 7.—Shows an option related to the geometry of the internal stringer of the torsion box which is applicable to the interface area between the skin of said torsion box and the symmetrical flanges of the triform joining fitting.
Figure 8:
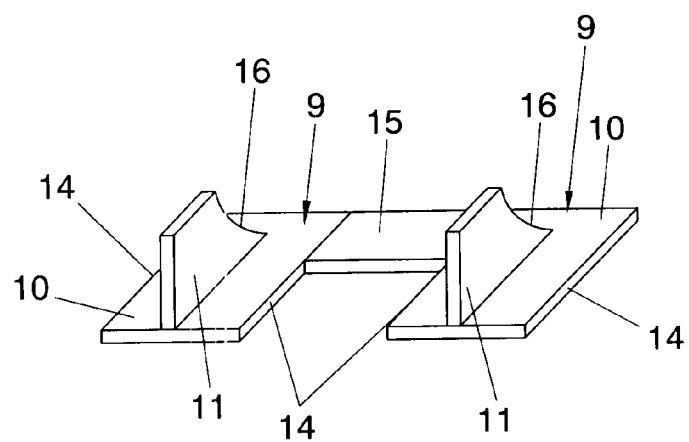
FIG. 8.—Shows a view similar to the previous one with a different embodiment.

The joint of the symmetric flanges 3 of the triform fittings 1 to the feet 10 of the internal stringers 9 is simple, always avoiding joggles in the geometry of said symmetrical flanges 3. This requires the feet 10 of the internal stringers 9, in a first case to be extended 13 so that they are close to each other at their adjacent longitudinal edges 14 (FIG. 7) or else, in a second case, said longitudinal edges 14 are separated (FIG. 8) so that in this case, a supplementary element 15 will be included in those intermediate spaces that exist between the edges.

The joint between the symmetrical flanges 3 of the triform fitting 1 and the skins 7 of the torsion boxes 6 together with the feet of the internal stringers 9 is carried out by means of the corresponding rivets 12, the diameters of which vary between 6.4 mm and 11.1 mm, which are preferably distributed in two rows in the intermediate area and in three rows in the ends of the symmetrical flanges 3 near the internal stringers 9 due to the local increase of stress in said areas with regard to said intermediate area.

The run-outs 16 of the webs 11 of the internal stringers 9 which fit in the respective cross slots 8 of the symmetric flanges 3 of the fitting 1 are cut according to a curved shape 16, said end section of the stringer feet 10 being the part that is placed on the symmetrical flanges 3 of the triform fitting 1.

On the other hand, the triform fitting 1 is joined by its longitudinal flange 2 to a center rib 17 of the aircraft by means of two rows of rivets 12, preferably having a diameter of 6.4 mm, in such a way that said center rib 17 includes some straight slots 18 wherein the cross reinforcing ribs 4 are housed as is more clearly shown in FIG. 5.

Figure 9:
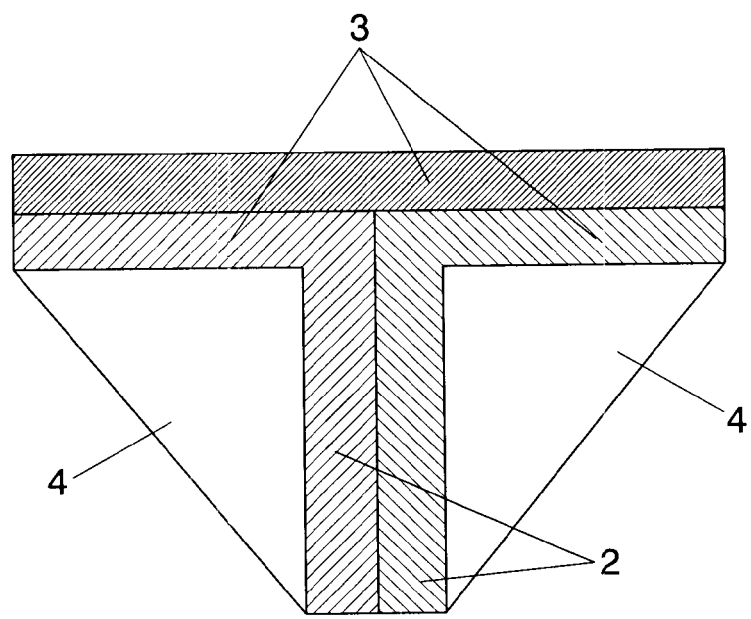
FIG. 9.—Represents a cross section view of the triform joining fitting. The different laminates that make up the symmetrical flanges, longitudinal flange, and ribs of the triform fitting are essentially shown, as well as the different preforms which make up each one of the sections of the triform fitting.
Figure 10:
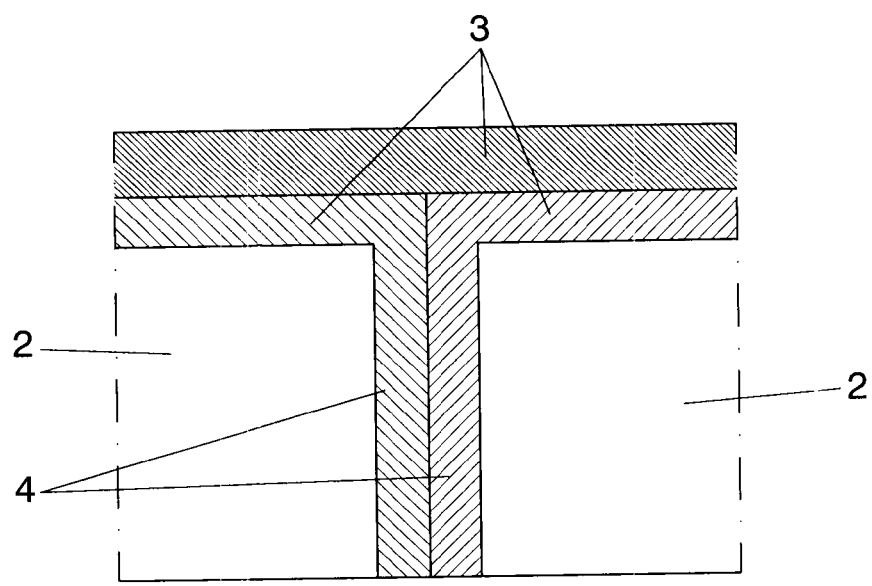
FIG. 10.—Represents a longitudinal section view of the triform fitting wherein its different laminates are shown, as well as the different preforms that make up each one of the sections of the triform fitting.
Figure 11:
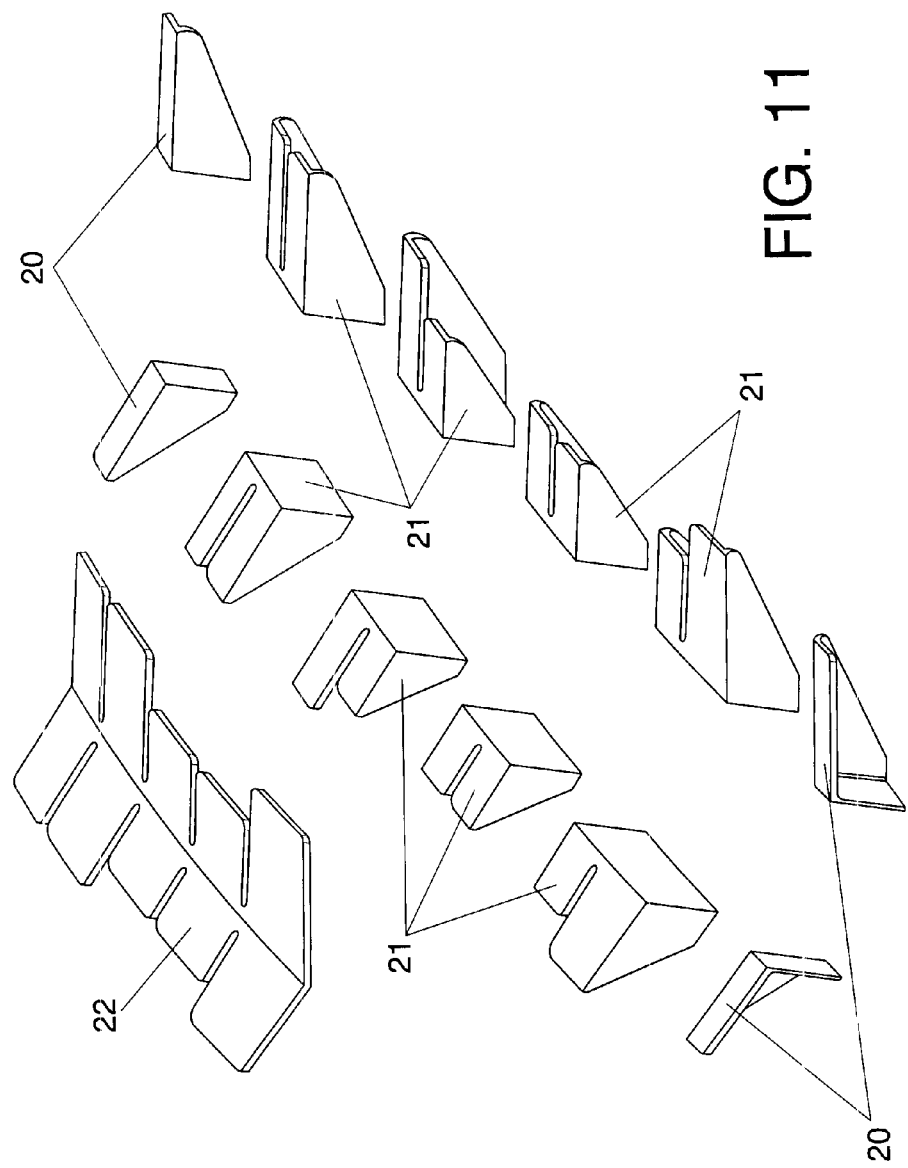
FIGS. 11 and 12.—Show exploded perspective views of the different preforms that make up the triform fitting before they are joined to each other.

The cross ribs 4 are distributed longitudinally along the entire length of the triform fitting 1, placing a cross rib 4 on each side of the symmetry plane of the fitting 1 at a point halfway between each internal stringer 9. These cross ribs 4 are part of the laminate that forms the longitudinal flange 2 of the triform fitting 1 and part of the laminate that forms the symmetric flanges 3 of the cited fitting 1, as is more clearly shown in FIGS. 9 and 10. This is achieved either by a forming process or by making the laminate with said geometry. This manufacturing process ensures that the transmission of loads is efficient and therefore, it strengthens the center node 5 preventing the appearance of delaminations.

Figure 2:
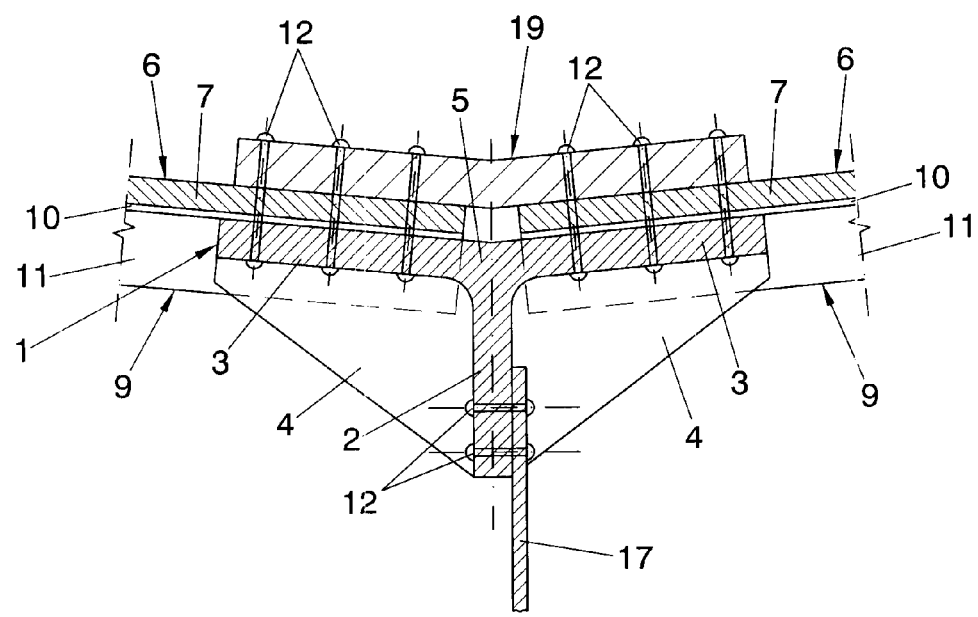
FIG. 2.—Represents a view similar to the previous one where a double shear joint of the torsion boxes is shown.
Figure 3:
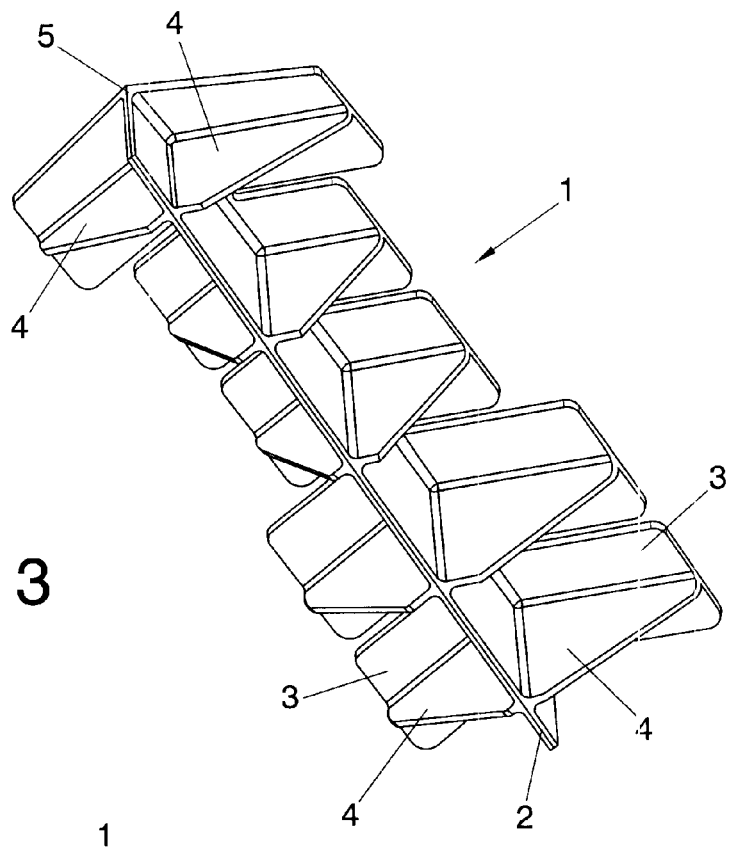
FIG. 3.—Shows a perspective view of the triform fitting wherein its characteristic architecture is shown in detail.
Figure 4:
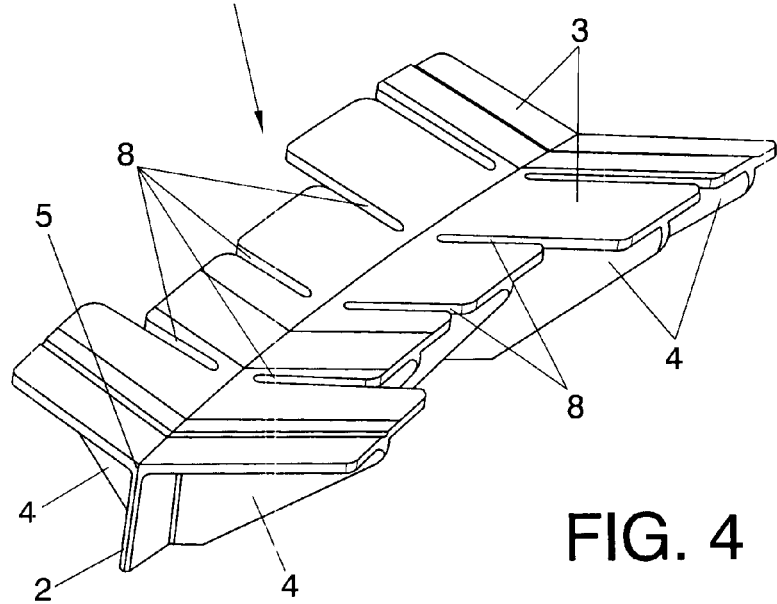
FIG. 4.—Shows another perspective view of the triform fitting.

This structural concept is totally applicable both to a single shear joint as is the one shown in FIG. 1 and to a double shear joint as the one shown in FIG. 2 in which, due to the magnitude of the existing loads, an external plate 19, placed on some end areas of the skins 7 of the torsion boxes 6 and fixed to them by means of the same rivets 12 which join the torsion boxes 6 to the symmetrical flanges 3 of the corresponding fitting 1, are added.

As is more clearly shown in FIGS. 9, 10, 11 and 12, the triform fitting comprises several preforms defined by pairs of preformed side laminates end ones 20-20' and center ones 21-21' and a preformed upper laminate 22-22'. These cited laminates are entirely joined by means of a resin transfer molding (RTM) process or by means of pre-impregnated resin in order to form the triform fitting 1 as a single entire part.

The pairs of end preformed side laminates 20-20' comprise a part of the thickness of the symmetric flanges 3, one half of the thickness of the longitudinal flange and one half the thickness of the cross ribs 4. The centre preformed lateral laminates 21-21' include the halves of the thicknesses of two contiguous cross ribs 4.

The preformed top laminate 22-22' comprises a part of the thickness of the symmetric flanges 3, joining said top laminate 22-22' to every part of the symmetric flanges 3 of the different preformed side laminates 20-20', 21-21'.

The invention claimed is:

1. A triform fitting made from non-metallic composite materials, for joining torsion boxes in an aircraft, comprising:
    two symmetrical flanges and a longitudinal flange converging at a central node, the two symmetrical flanges each having an external face opposite the longitudinal flange, the longitudinal flange being joined to an aircraft center rib by rivets, and
    a plurality of cross ribs that reinforce a joint between the symmetrical flanges and the longitudinal flange of the triform fitting, the cross ribs being oriented perpendicular to the longitudinal flange and the symmetric flanges,
    wherein skins of the torsion boxes are joined to the two symmetrical flanges by rivets, the torsion boxes having T-shaped internal stringers comprising feet joined to webs, the feet having a first faces opposite the webs and a second faces adjacent to the webs,
    wherein the first faces of the feet are joined to the skins of the torsion boxes,
    wherein at least a portion of the second faces are placed on the external faces of the symmetrical flanges such that the symmetrical flanges of the triform fitting are arranged inside the torsion boxes, and
    wherein the center rib of the aircraft comprises straight slots, the cross ribs of the triform fitting passing through the straight slots of the center rib.

2. The triform fitting according to claim 1, wherein the symmetrical flanges of the triform fitting include cross slots where run-outs of the webs of at least some of the internal stringers of the torsion boxes are fitted.

3. The triform fitting according to claim 1, wherein the webs of at least some of the internal stringers does not reach one of the ends thereof, a terminal part thus being defined in the feet of the internal stringers without interruption of the webs, the terminal part being placed on the symmetric flanges of the triform fitting so as to be joined with the symmetric flanges.

4. The triform fitting according to claim 1, wherein the feet of adjacent internal stringers of the torsion boxes include longitudinal edges proximal to each other.

5. The triform fitting according to claim 1, wherein the feet of adjacent internal stingers of the torsion boxes include longitudinal edges spaced apart from each other, such that a supplementary element is disposed in a space between adjacent longitudinal edges of two consecutive stringers.

6. The triform fitting according claim 1, wherein the cross ribs are distributed along a length of the triform fitting on both sides of the longitudinal flange, each of the cross ribs being situated halfway between each of the adjacent internal stringers.

7. The triform fitting according to claim 1, further comprising an external plate that is placed on an external area of the skins of the torsion boxes, the external plate being fastened by the same rivets that fasten the skins of the torsion boxes to the symmetrical flanges of the triform fitting.

8. The triform fitting according to claim 1, wherein the triform fitting comprises several preforms defined by pairs of end side preformed laminates and center side preformed laminates, and an upper preformed laminate which is part of the symmetric flanges, the laminates being joined by their contact surfaces by resin.

9. The triform fitting according to claim 8, wherein pairs of side preformed laminates comprise a part of a thickness of the symmetric flanges, a half of a thickness of the longitudinal flange and a half of a thickness of the cross ribs in the end side preformed laminates, wherein the center side preformed laminates include a half of a thickness of two contiguous cross ribs, the upper preformed laminate comprising a portion of a thickness of the symmetric flanges, the upper laminate being joined to each of the pairs of side preformed laminates.

\* \* \* \* \*